United States Patent [19]

Vollmoeller

[11] 4,290,568

[45] Sep. 22, 1981

[54] AIRCRAFT EJECTION SEAT SAFETYING DEVICE

[75] Inventor: Philip K. Vollmoeller, Riverhead, N.Y.

[73] Assignee: The United States of America as represented by the Secretary of the Air Force, Washington, D.C.

[21] Appl. No.: 92,818

[22] Filed: Nov. 9, 1979

[51] Int. Cl.³ .............................................. B64D 25/10
[52] U.S. Cl. .................... 244/122 A; 70/202; 70/211; 74/526; 244/1 R; 244/224
[58] Field of Search ........ 244/122 R, 122 A, 122 AB, 244/122 AC, 122 AD, 122 AE, 122 AF, 122 AG, 122 B, 121, 1 R, 129.1, 141, 224; 70/202, 203, 204, 211, 212; 89/1 B; 74/526

[56] References Cited

U.S. PATENT DOCUMENTS

| | | | |
|---|---|---|---|
| 2,512,987 | 6/1950 | Young | 74/526 |
| 2,664,737 | 1/1954 | Holmsten | 70/211 |
| 3,633,852 | 1/1972 | Forman et al. | 244/122 A |

*Primary Examiner*—Charles E. Frankfort
*Attorney, Agent, or Firm*—Donald J. Singer; Arsen Tashjian

[57] ABSTRACT

The device retains the ejection seat arm/dearm lever in safe position to allow the seat to be tilted safely for required maintenance and repair work. A bolt positioned through a clearance hole in an inverted U-shaped base member engages threads in the ejection seat structure. An upstanding brace extends upward from one end of the base member at an angle to abut the seat ejection arming lever to physically block and prevent its movement into the armed position. The bolt is retained in the base member by a cotter pin through the body of the bolt under the head to allow turning while preventing separation from the base.

2 Claims, 3 Drawing Figures

AIRCRAFT EJECTION SEAT SAFETYING DEVICE

STATEMENT OF GOVERNMENT INTEREST

The invention described herein may be manufactured and used by or for the Government for governmental purposes without the payment of any royalty thereon.

BACKGROUND OF THE INVENTION

This invention relates to an aircraft ejection seat safety device and, more particularly, the invention is concerned with providing a device for attachment to an ejection seat to prevent accidental arming of the seat when the seat is tilted forward during routine maintenance and/or repair work on the avionics systems in the seat area.

Heretofore, in order to maintain the ejection seat on a high performance aircraft in the safe configuration, it has been necessary to install seat arming lever safety pins in the seat structure to prevent the arm/dearm lever from being accidentally armed. Although this arrangement is satisfactory as long as the ejection seat is not tilted, if any maintenance or repair work needs to be done to any of the avionic systems behind and under the seat, the seat must be tilted. However, the seat cannot be tilted with the safety pin in position because the pin contacts the lefthand console and prevents further movement. Thus, in order to do the required work in the seat area either the entire seat with its canopy must be lifted out of the aircraft or the safety pin must be taken out of position. Obviously, the removal of the seat and canopy is a time consuming, burdensome and costly undertaking. Likewise, working in the seat area with the safety pin out is not recommended because the arm/dearm lever on the ejection seat will then be in position to arm by accident or otherwise.

Another drawback to the presently used system for safetying the ejection seat is that the arming lever safety pin can be installed when the seat arming lever is in either the safe position or the armed position. This gives a false impression of safety if the lever should happen to be in an armed position resulting in another dangerous condition. It would be most desirable to provide a device which could be placed in position after the safety pin is removed and which would serve the same purpose as the safety pin. The device would prevent the arm/dearm lever from arming while at the same time allowing the seat to be fully tilted without being obstructed by the left hand console.

SUMMARY OF THE INVENTION

The invention is concerned with providing a safetying device for attachment to the lower left hand portion of an aircraft ejection seat to butt up against the arm/dearm lever and prevent the lever from being accidentally placed into the armed position. The safetying device includes a small cotter pin attached through the body of a large bolt under the head to prevent the bolt from separating from the device during attachment and/or detachment from the seat. By preventing the screw from coming off and falling into the cockpit, foreign object damage to the aircraft is prevented.

Accordingly, it is an object of the invention to provide a safetying device for use on an aircraft ejection seat to keep the seat in a safe configuration while in the tilted position.

Another object of the invention is to provide an ejection seat safetying device for retaining the arm/dearm lever of the ejection seat in a safe position so that the seat can be tilted safely to allow necessary maintenance and repair work to be accomplished.

Still another object of the invention is to provide an ejection seat safetying device which will maintain the seat in a safe configuration as long as the device remains installed in position on the seat.

A further object of the invention is to provide a safetying device for use on an aircraft ejection seat wherein the seat can be tilted to repair and maintain avionic systems behind and under the seat.

A still further object of the invention is to provide an ejection seat safetying device which takes the place of the presently available arm/dearm safety pin. This allows the seat to be tilted without removing the seat with its canopy from the aircraft.

These and other objects, features and advantages will become more apparent after considering the following detailed description taken in conjunction with the annexed drawings and appended claims.

DESCRIPTION OF A PREFERRED EMBODIMENT

Figure 1:
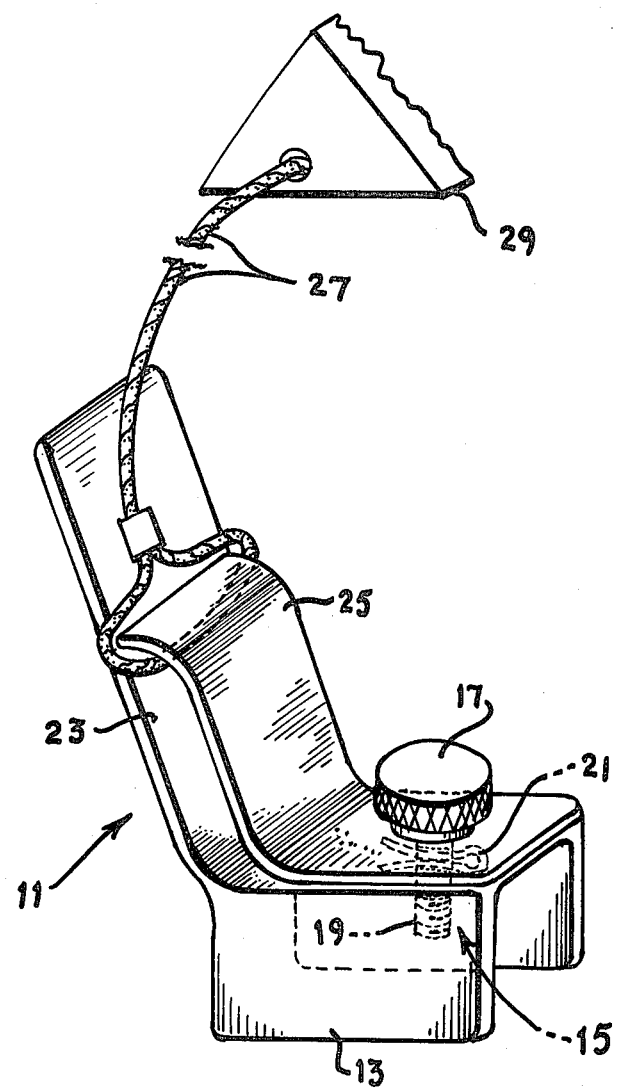
FIG. 1 is a view in isometric of the safetying device according to the invention showing the center bolt with the cotter pin through its body to prevent separation from the device.

Referring now to the drawings wherein like reference numerals refer to like elements in the several views, in FIG. 1 there is shown safetying device 11 according to the invention including an inverted U-shaped base member 13. A bolt 15 having a knurled head 17 is positioned through a clearance hole in the upper surface of the base member 13. The lower end of the bolt 15 includes a threaded portion 19 for engaging threads in the ejection seat. A cotter pin 21 passes through the body of the bolt 15 near the head 17 just under the upper surface of the base member 13. This arrangement allows the bolt 15 to turn freely in the clearance hole in the base member 13 while at the same time prevents separation of the bolt 15 from the safetying device with the possible loss and damage caused by a loose foreign object in the aircraft cockpit.

An upstanding brace portion 23 extends upwardly from one end of the base member 13 at an angle therefrom. A reinforcing element 25 is fixedly attached between the other end of the base member 13 in contact with the upper surface thereof and extends along the upstanding portion 23 spaced therefrom and is fixedly attached near the upper end thereof. The reinforcing element 25 is approximately the same width as the top of the base member 13 and the upstanding portion 23 and is attached by welding or the like to the device. One end of a wire cable 27 is passed through the space between the reinforcing element 25 and the upstanding brace member 23 to form a loop for permanent attachment to the safetying device and a red flag 29 is attached to the other end of the cable 27 with the words "REMOVE BEFORE FLIGHT" printed thereon in large white letters. This ensures that the safetying device will not be overlooked prior to aircraft take off since the device must be removed in order to arm the ejection seat and the ejection seat must be armed to provide the last resort of escape from a disabled aircraft.

Figure 2:
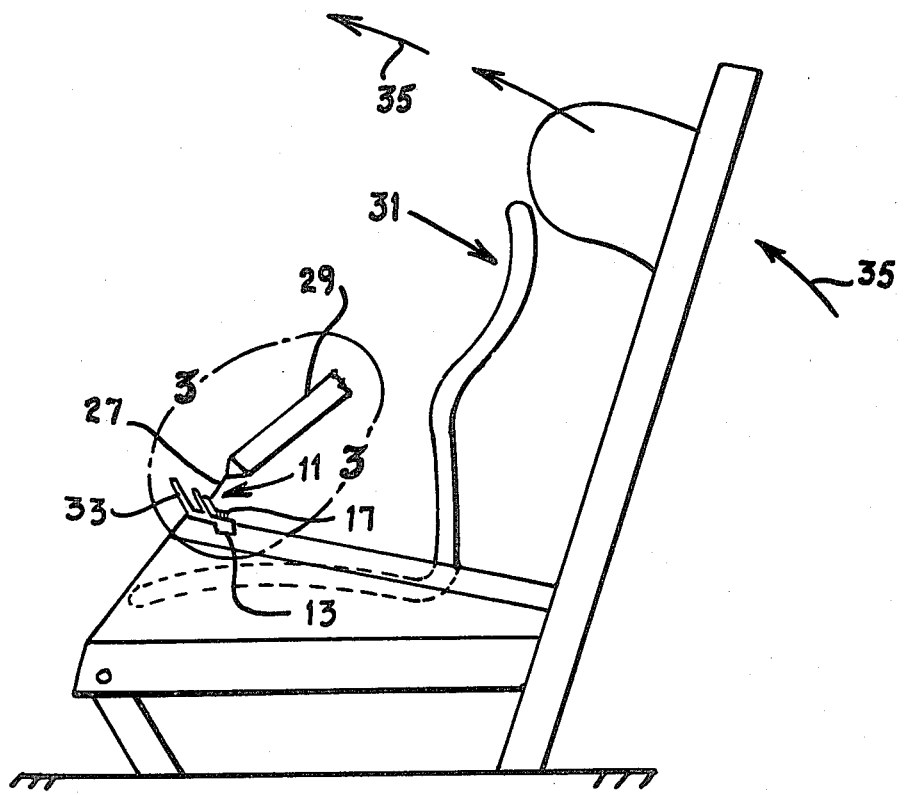
FIG. 2 is a schematic view of the safetying device attached to an aircraft ejection seat to prevent the arm/dearm lever from being accidentally armed.

In FIG. 2, the safetying device 11 is shown attached to the left front portion of the ejection seat 31 adjacent to the arm/dearm lever 33 of the ejection seat 31. The arm/dearm lever 33 is arranged to operate only when safety pins (not shown) on another portion of the ejection seat 31 are removed. However, when it becomes necessary to do routine maintenance on the avionics systems of the aircraft, the ejection seat 31 must be tilted forward in the direction of the arrows 35. This cannot be done with the safety pins in the engaged position because one of the pins bumps against the console at the left front of the cockpit and impedes the seat's forward tilting motion. Thus, the seat 31 cannot be tilted satisfactorily for repairs of the avionics system without taking out the safety pin and once the safety pin is taken out, then the arm/dearm lever 33 is in a position to arm by accident or otherwise.

Figure 3:
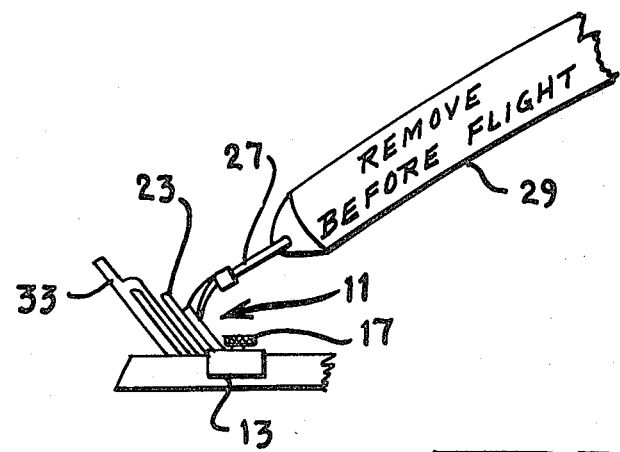
FIG. 3 is an enlarged view of the circled area in FIG. 2 to show details of the safetying device in position against the arm/dearm lever.

With the ejection seat safetying device 11 in position on the ejection seat 31, the arm/dearm lever is prevented from arming and the safety pins can be safely removed without the danger of accidental arming. The upstanding portion 23 of the device 11 rests against the arm/dearm lever 33 and prevents accidental arming. This arrangement is shown more clearly in FIG. 3 which shows the cable 27 attached to the device 11 with the red flag 29 in place on the seat to warn against take off of the aircraft with the device 11 in position.

The hereinbefore described ejection seat safetying device 11 is designed especially for use with the F-16 ACES II ejection seat arm/dearm lever 33 and is attached to the seat sling attach point located on the lower left hand portion of the seat. The device 11 is preferably fabricated of 1/16 inch stainless steel but can be constructed of any material which will serve the purpose. At the present time using the present method of safetying, the ejection seat cannot be tilted. With the hereinbefore described device, the problem of safetying the ejection seat while the seat is tilted is solved. This insures that any required maintenance tasks behind and under the seat can be performed in the safest possible manner.

Although the invention has been illustrated in the accompanying drawings and described in the foregoing specification in terms of a preferred embodiment thereof, the invention is not limited to this embodiment. It will be apparent to those skilled in the art that certain changes, modifications and substitutions can be made with respect to the shape of the elements without departing from the true spirit and scope of the appended claims.

Having thus set forth the nature of my invention, what I claim as new and desire to secure by Letters Patent of the United States is:

1. A safetying device for attachment to an aircraft ejection seat having an arm/dearm lever positioned thereon, said device comprising an inverted U-shaped base member having a clearance hole through the center of the upper portion thereof, a bolt having a knurled head portion, a body portion and a threaded end portion positioned through the clearance hole in said base member, means for preventing said bolt from separating from the device when not in position on the seat, an upstanding brace portion extending upward at an angle adjacent to the arm/dearm lever on the ejection seat to prevent accidental arming thereof, and a red flag attached to said safetying device to indicate that the device is in position thereby allowing the ejection seat to be tilted forward for maintenance and repair work to be accomplished on avionics systems behind and under the seat without danger of accidentally arming the arm/dearm lever.

2. The safetying device for attachment to an aircraft ejection seat defined in claim 1 wherein said means for preventing said bolt from separating from the safetying device includes a cotter pin passing through the body of said bolt immediately under the upper surface of said inverted U-shaped base member thereby allowing the bolt to turn freely in the clearance hole while preventing the bolt from becoming separated from the safetying device.

* * * * *